(12) United States Patent
Kolvick, Jr. et al.

(10) Patent No.: US 7,526,686 B2
(45) Date of Patent: Apr. 28, 2009

(54) APPARATUS, SYSTEM, AND METHOD FOR ACTIVE DATA VERIFICATION IN A STORAGE SYSTEM

(75) Inventors: Robert John Kolvick, Jr., Tucson, AZ (US); Karl Allen Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 10/912,715

(22) Filed: Aug. 4, 2004

(65) Prior Publication Data

US 2006/0031722 A1    Feb. 9, 2006

(51) Int. Cl.
*G06F 11/00* (2006.01)
(52) U.S. Cl. .......................................... 714/54; 714/6
(58) Field of Classification Search .................. 714/52
See application file for complete search history.

(56) References Cited

U.S. PATENT DOCUMENTS

| | | | | |
|---|---|---|---|---|
| 5,495,572 A | * | 2/1996 | Tanaka et al. ................. 714/47 |
| 5,632,012 A | * | 5/1997 | Belsan et al. .................. 714/6 |
| 6,043,945 A | * | 3/2000 | Tsuboi et al. ................. 360/53 |
| 6,195,761 B1 | * | 2/2001 | Kedem ........................... 714/6 |
| 2001/0047497 A1 | | 11/2001 | Larson et al. ................. 714/42 |
| 2002/0036855 A1 | * | 3/2002 | Lenny et al. .................. 360/53 |
| 2002/0162075 A1 | | 10/2002 | Talagala et al. ............. 714/819 |
| 2002/0162076 A1 | | 10/2002 | Talagala et al. ............. 714/819 |
| 2002/0169995 A1 | * | 11/2002 | Archibald et al. ............. 714/6 |
| 2003/0135794 A1 | | 7/2003 | Longwell et al. ............. 714/42 |
| 2003/0140288 A1 | * | 7/2003 | Loaiza et al. ............... 714/718 |
| 2003/0145270 A1 | * | 7/2003 | Holt ........................... 714/766 |
| 2005/0114338 A1 | * | 5/2005 | Borthakur et al. ............. 707/9 |
| 2005/0114728 A1 | * | 5/2005 | Aizawa et al. ................. 714/6 |

\* cited by examiner

*Primary Examiner*—Gabriel L Chu
(74) *Attorney, Agent, or Firm*—Kunzler & McKenzie (57) ABSTRACT

An apparatus, system and method of verifying data are provided. Active data are identified among data on a storage device, records the location of the active data, and the integrity of the active data are verified. In one embodiment, data in segments adjacent to the active data segments are also identified and verified for improved data reliability. The data verification may be used to increase data reliability with low system resource usage.

27 Claims, 8 Drawing Sheets

APPARATUS, SYSTEM, AND METHOD FOR ACTIVE DATA VERIFICATION IN A STORAGE SYSTEM

BACKGROUND OF THE INVENTION

1. Field of the Invention

This invention relates to verifying data in a storage subsystem and more particularly relates to identifying and verifying the active data in the storage subsystem.

2. Description of the Related Art

A typical storage system, such as a redundant array of independent drives ("RAID") structure, requires maintenance of the data in order to prevent data loss. One method for maintaining the data is to verify the data periodically. If data has been corrupted, the corrupted data can be isolated or recovered from redundant data. Data verification may be referred to as scrubbing.

The verification and correction process can become problematic in several ways. Often, the entire storage device is verified even if there is no useful data in many volumes, sectors or tracks of the storage device. Excessive storage subsystem resources are required to carry out the verification and correction process on all data in the storage system. Additionally, if the data written is not verified until the rest of the data on the storage device is verified, the exposure time of potentially corrupt data is unnecessarily prolonged.

To reduce the system requirements of verification and correction, processes have been developed that direct writes to a reduced portion of the storage system and then restrict verification to the reduced portion. However, the reduced portion strategy may reduce the storage system performance in other areas. In addition, data that is not written may also be corrupted. If data is modified or written to a storage device, data segments adjacent the sector being written may be corrupted. Data loss may also occur in a segment if corrupt data is rebuilt from redundant data that has also been corrupted.

Accordingly, a need exists for a process, apparatus, and system that verify only selected data in a storage system. Beneficially, such a process, apparatus, and system would reduce system resource requirements by reducing the quantity of data to be verified, while still increasing data reliability.

SUMMARY OF THE INVENTION

The present invention has been developed in response to the present state of the art, and in particular, in response to the problems and needs in the art that have not yet been fully solved by currently available data storage systems. Accordingly, the present provides a process, apparatus, and system for verifying active data that overcome many or all of the above-discussed shortcomings in the art.

The apparatus for verifying data is provided with a logic unit containing a plurality of modules configured to functionally execute the necessary steps of identifying active data on the storage device and verifying the active data. These modules in the described embodiments include an active data identification module and an active data verification module.

The active data identification module is configured to identify active data and records the location of the active data on the storage device. In one embodiment, active data is data written to a storage device with a specified time interval. The active data identification module may record the location of the data as the data is written to the storage device. The active data verification module is configured to verify the active data. In one embodiment, the active data verification module verifies the active data by calculating an error code for the active data and comparing the calculated error code with a stored error code. The active data is deemed invalid if the error code and the stored error code are not equivalent.

The active data verification module is further configured, in one embodiment, to verify the active data by recovering the active data from redundant data if the active data is invalid. In one embodiment the redundant data is stored on the storage device. The active data identification module may be configured to identify and verify data segments adjacent to the active data segments. The apparatus reduces the system requirements of data verification and correction by limiting verification and correction to active data.

A system of the present invention is also presented for verifying and correcting active data. The system may be embodied in a system of hard disk drives. The system includes a storage device configured to store and retrieve data and a controller configured to identify and verify the active data. The controller identifies active data written to the storage device. In one embodiment, active data is data written to the storage device within a specified time interval. In a certain embodiment, active data includes data segments adjacent to the segments where active data is written. The controller records the location of the active data. In addition, the controller verifies the active data. In one embodiment, the controller verifies the active data by recovering the active data from redundant data if the active data is invalid. In one further embodiment, the control device is configured to verify data segments adjacent to the active data segments. The system performs efficiently, with reduced active scrub time and improved data integrity.

A process of the present invention is also presented for verifying data. The process in the disclosed embodiments substantially includes the steps necessary to carry out the functions presented above with respect to the operation of the described apparatus and system. The process identifies the active data among data on a storage device and verifies the integrity of the active data. In one embodiment the process sets an identifier grouping the active data to be verified. In one embodiment the process includes verifying the active data by calculating an error code for the active data and comparing the calculated error code with a stored error code wherein the active data is invalid if the calculated error code and the stored error code are not equivalent. If the active data is invalid, the process may recover the active data. In one embodiment, the active data is recovered from redundant data. In a further embodiment, the process includes verifying data segments adjacent to active data segments. The process reduces the need for constant verification of all data on a storage device, and improves system performance by focusing verification on the data actually written to the storage device, not the entire storage device contents.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention verifies active data on a storage device. In addition, the present invention may reduce the overhead of maintaining storage device data integrity. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
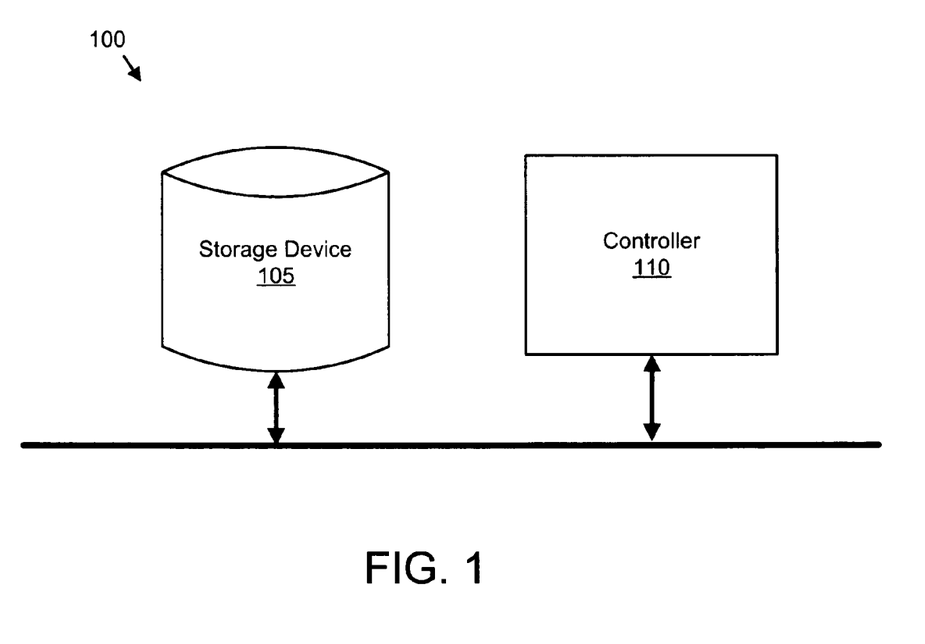
FIG. 1 is a block diagram illustrating one embodiment of a system for verifying data in accordance with the present invention.

FIG. 1 depicts one embodiment of a system for verifying data 100. The system 100 of the present invention includes a storage device 105 and a controller 110. Although the system 100 is depicted with one storage device 105 and one controller 110, any number of storage devices 105 and controllers 110 may be employed. The storage device 105 stores and retrieves data. The storage device 105 may be a hard disk drive. In an alternate embodiment, the storage device 105 may be a removable storage device such as a magnetic tape cartridge drive, an optical storage device, or a mechanical storage device such as a micro-mechanical storage device.

In one embodiment the controller 110 controls the transfer of data to and from the storage device 105 via a communications connection such as data bus. The controller 110 further identifies active data among data on the storage device 105, records the location of the active data, and verifies the integrity of the active data. In a certain embodiment, the controller identifies active data among dedicated data. The term "dedicated data" as used herein is intended to mean data stored on a storage device that is accessible for use by any other device interfacing with the storage device. Active data may be data that has been written, moved or changed on the storage device within a specified time interval. In an alternate embodiment, active data is data that is has been written but has not been verified. The controller 110 may verify the active data by calculating an error code for the active data and comparing the calculated error code with a stored error code. The controller 110 may determine that the active data is invalid if the calculated error code and stored error code are not equivalent. The system 100 reduces the resources required to verify data on the storage device 105 by identifying and verifying active data.

Figure 2:
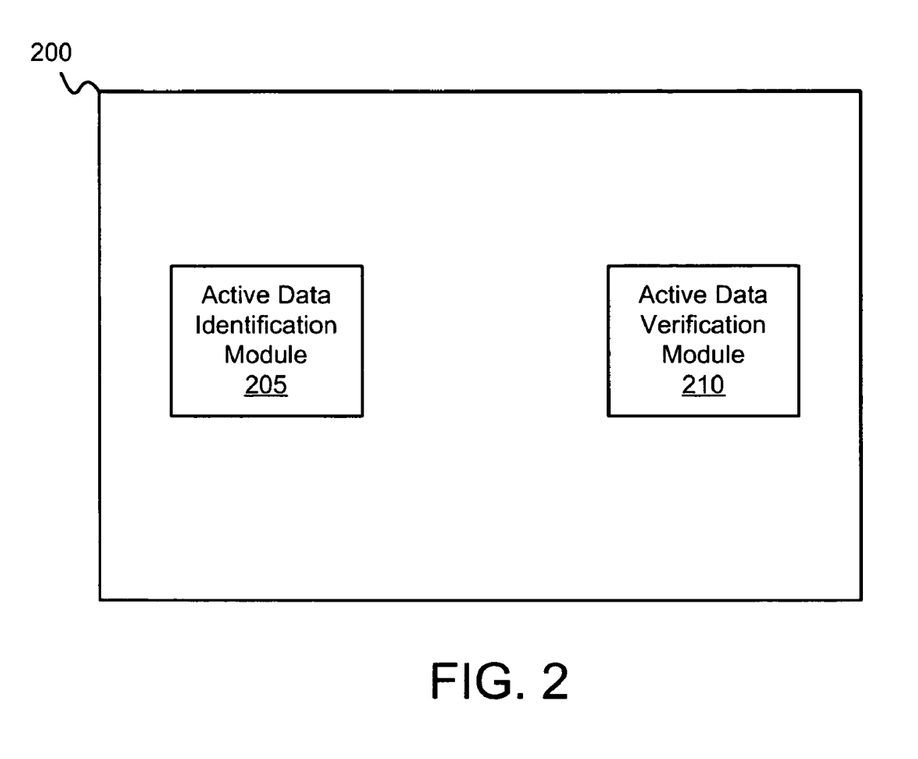
FIG. 2 is a block diagram illustrating one embodiment of an apparatus for verifying data in accordance with the present invention.

FIG. 2 depicts one embodiment of an apparatus for verifying data 200. The apparatus 200 may be included in the controller 110 of FIG. 1. The apparatus 200 includes two modules, an active data identification module 205 and the active data scrub module 210. The active data identification module 205 identifies active data on the storage device 105 and records the location of the active data. In one embodiment, the active data identification module 205 identifies active data as the data is stored on the storage device 105. In an alternate embodiment, the active data identification module 205 identifies active data as data written within a specified time interval. The active data scrub module 210 verifies the active data.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
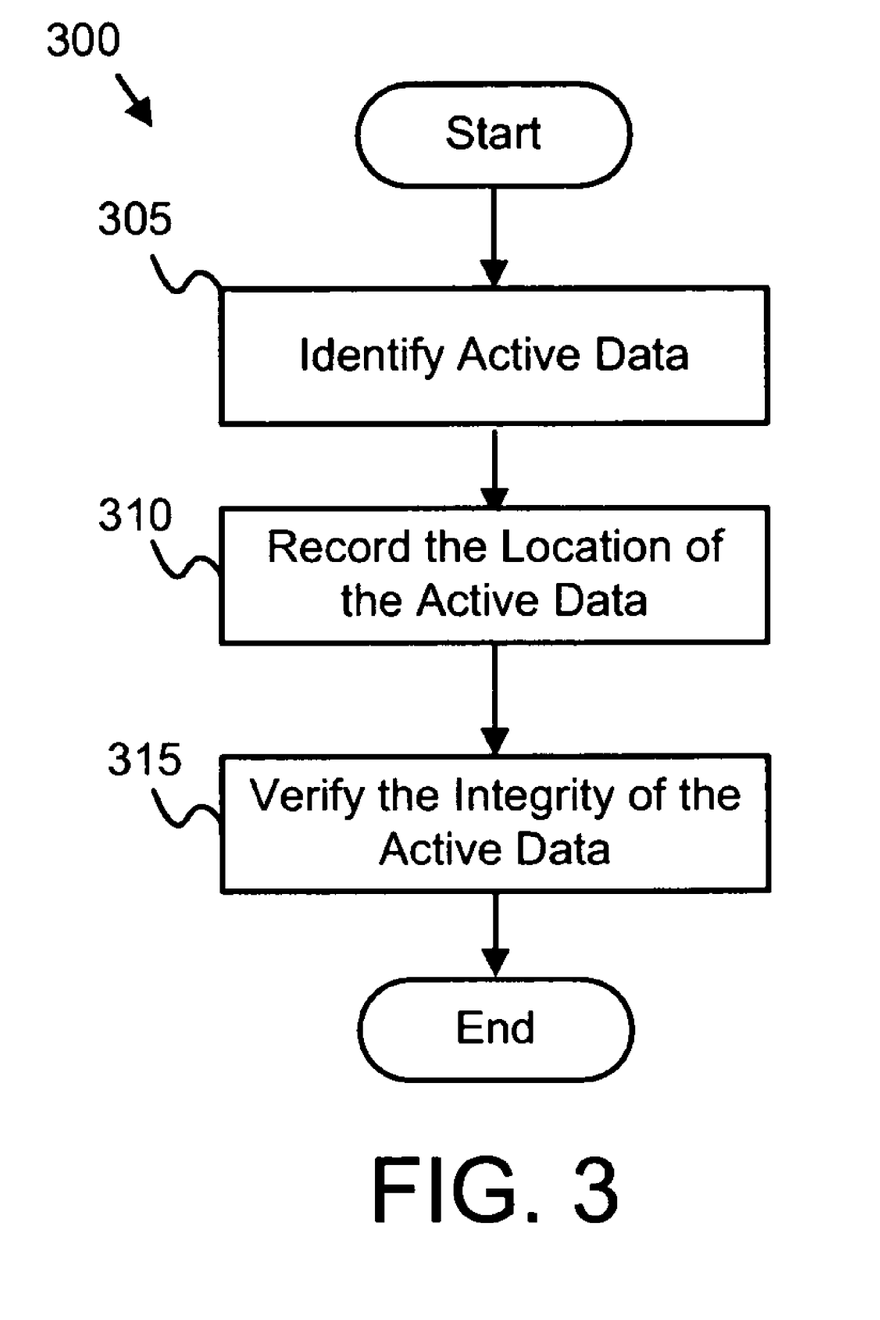
FIG. 3 is a flow chart diagram illustrating one embodiment of a method for verifying data in accordance with the present invention.

FIG. 3 depicts one embodiment of a method for verifying data 300. The method 300 identifies 305 active data on a storage device 105. In one embodiment, the method 300 identifies 305 active data as the data is written to the storage device 105. In an alternate embodiment, the method 300 identifies 305 active data as data that has been written but not verified. In a certain embodiment, the method 300 flags data as written and unverified. In one embodiment, the method 300 may identify 305 active data as data written within a specified time interval. In addition, the method 300 records 310 the location of the active data. In one embodiment, the method 300 records 310 the location of the active data in a central file. In an alternate embodiment, the method 300 records 310 the location of the active data with a flag co-located with the active data.

The method 300 further verifies 315 the integrity of the active data. In one embodiment, the method 300 verifies 315 the integrity of the active data by comparing a calculated error code from the active data and a stored error code. The stored error code may be calculated when the active data is written. The method 300 may flag invalid data while verifying 315 active data. In one embodiment, verifying 315 the active data includes mitigating invalid data. In a certain embodiment, the method 300 mitigates the active data by restoring the active data if the active data is invalid. The method 300 may restore the active data using error correction codes. In a certain embodiment, the method 300 restores the active data from redundant data. Redundant data may be a copy of the active data. In one embodiment of the system 100, the method 300 is carried out on the data stored in the storage device 105 by the controller 110. The active data identification module 205 may carry out the identification step 305 and the recording step 310, and the active data verification module 210 may carry out the verification step 315 of the method 300.

Figure 4:
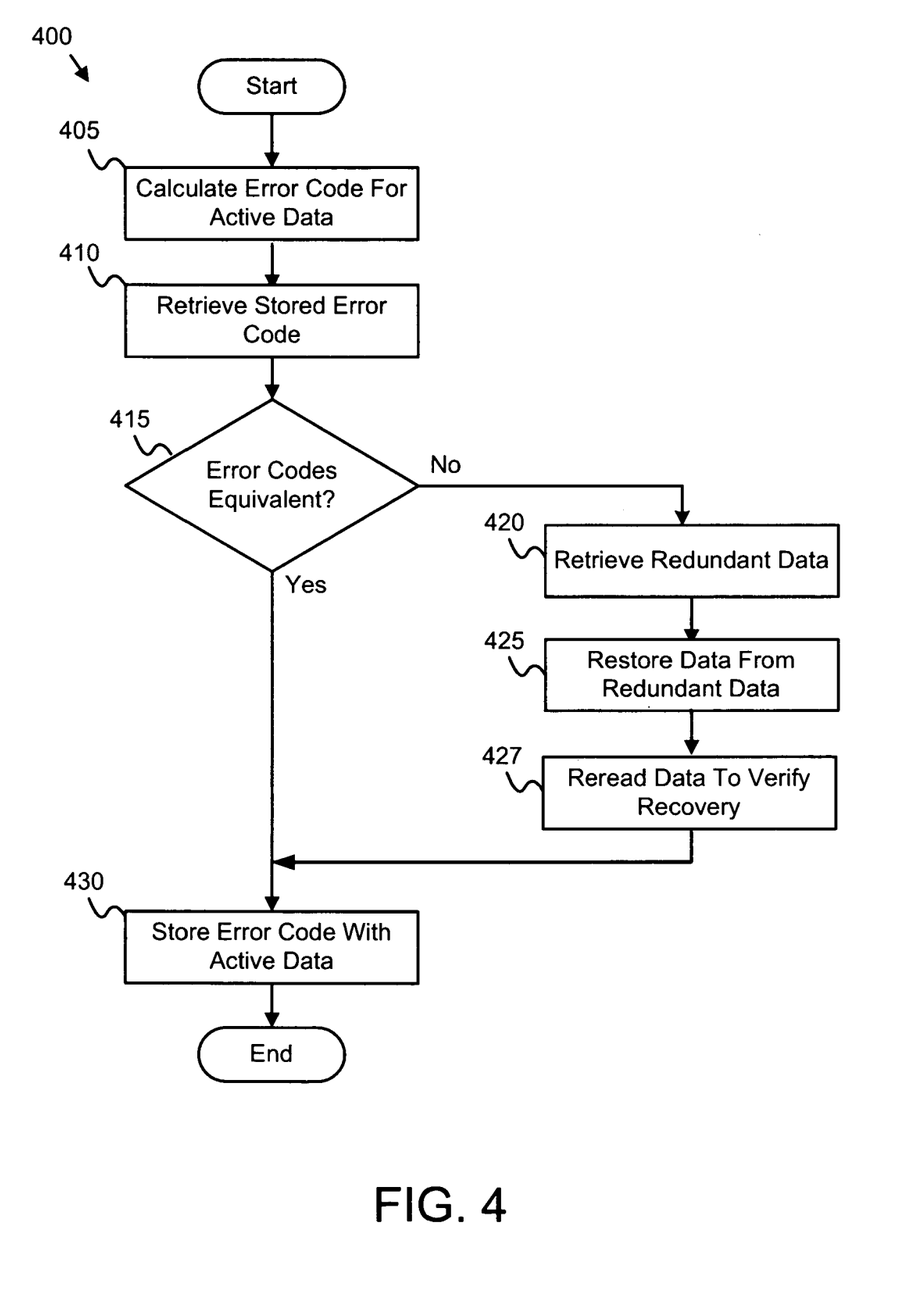
FIG. 4 is a flow chart diagram illustration one embodiment of a method for scrubbing data in accordance with the present invention.

FIG. 4 depicts one embodiment of a scrubbing data method 400. The method 400 includes calculating 405 an error code for active data and retrieving 410 a stored error code. In one embodiment, the stored error code is collocated with the active data. In an alternate embodiment, the stored error code is stored with redundant data. The stored error code may also be calculated from the redundant data. The method 400 determines 415 if the calculated and stored error codes are equivalent. If the error codes are equivalent, the method 400 stores 430 the active data is valid. If the method 400 determines 415 that the error codes are not equivalent, the method 400 retrieves 420 redundant data from the storage device, and the data is restored 425 from the redundant data. In one embodiment, the restored data is reread 427 to verify the integrity of the data recovery. The reread data maybe compared with the redundant data of to verify the data recovery. The active data's error code is also stored 430 on the storage device. The method 400 may be carried out by computer readable code configured to perform each of the steps in the scrubbing method 400.

Figure 5:
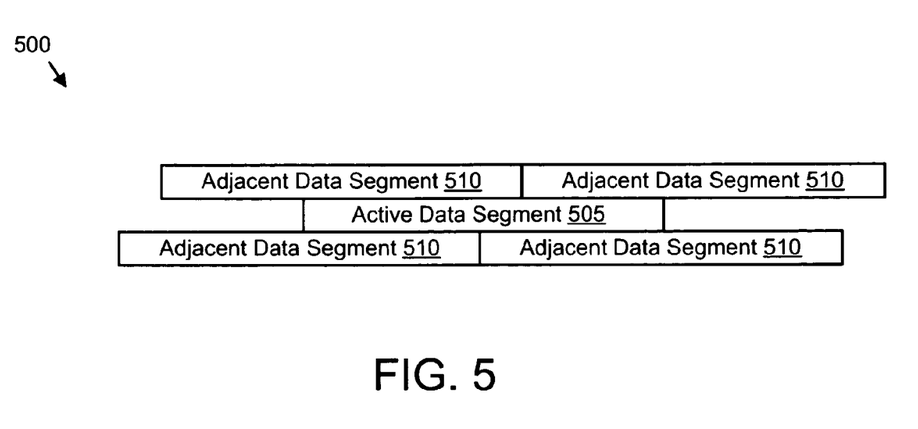
FIG. 5 is a diagram illustrating one embodiment of storage device segments in accordance with the present invention.

FIG. 5 depicts one embodiment of storage device segments 500. The segments 500 maybe tracks such as the tracks of a hard disk drive. Active data is taken from a data bus and written on an active segment 505 of memory on the storage device 105. Data is most likely to be corrupted as it is written to the storage device 105. In addition, data adjacent to data written to the active segment 505 may also be corrupted. Adjacent data segments 510 of memory may be any data segment within a specified proximity of the active data segment 505. In one embodiment, the adjacent data segments 510 are in direct proximity to the active data segment 505. In one embodiment, data in the adjacent data segments 510 are also considered active data. The group of segments 505, 510 depicted in FIG. 5 is a representation of one embodiment of tracks written on the storage device 105.

Figure 6:
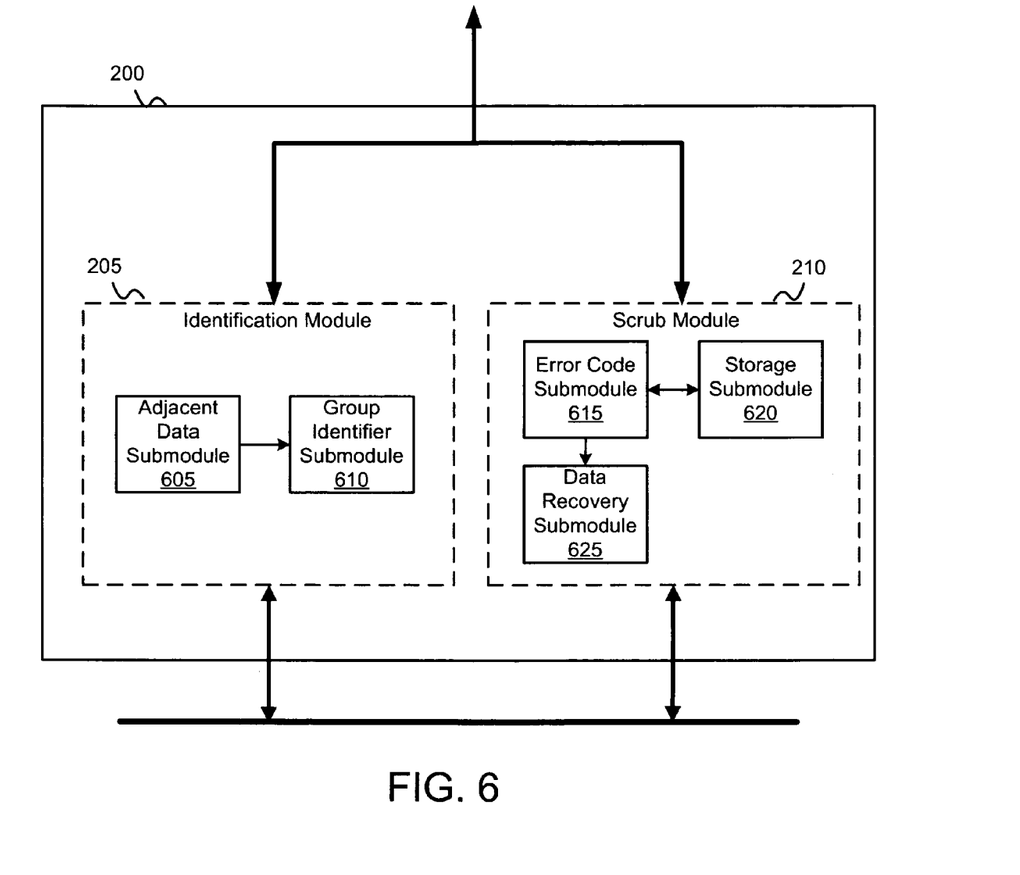
FIG. 6 is a block diagram illustrating in greater detail one embodiment of the apparatus for verifying data of FIG. 2.

FIG. 6 depicts one detailed embodiment of the apparatus for verifying data 200 of FIG. 2. The active data identification module 205 includes an adjacent data module 605 configured to identify adjacent segments 510. Adjacent segments 510 may also be considered to be active data, because of the possibility that the data in adjacent segments 510 may have been corrupted when the active data segment 505 was written.

In one embodiment, the active data segment 505 and the adjacent segment 510 are grouped by a group identifier module 610. The group identifier module 610 sets a first and a second identifier. The group identifier module 610 may set the first identifier for active data as the active data is written to the storage device 105. In a certain embodiment, the group identifier module 610 sets the first identifier for the active data stored within a specified time interval. The group identifier module 610 may further set the second identifier for the active data indicating the active data is to be verified on a subsequent verification cycle if a verification routine is in progress.

In one embodiment of the apparatus 200 the scrub module 210 includes an error code module 615, a storage module 620, and a data recovery module 625. The error code module 615 is configured to calculate the error code for the active data. During verification, the calculated error code is stored in the storage module 620. The error code module 615 then retrieves a stored error code and compares the calculated error code and the stored error code. If the error codes are equivalent, the active data and its error code are valid. If the error codes are not equivalent, the data recovery module 625 mitigates the corrupted data. In one embodiment, the data recovery module 625 retrieves redundant data from the storage device 105 and the active data is recovered from the redundant data. When the active data has been successfully recovered, both the active data and the redundant data may be stored on the storage device 105. In an alternate embodiment, the data recovery module 625 flags the active data as corrupted.

Figure 7:
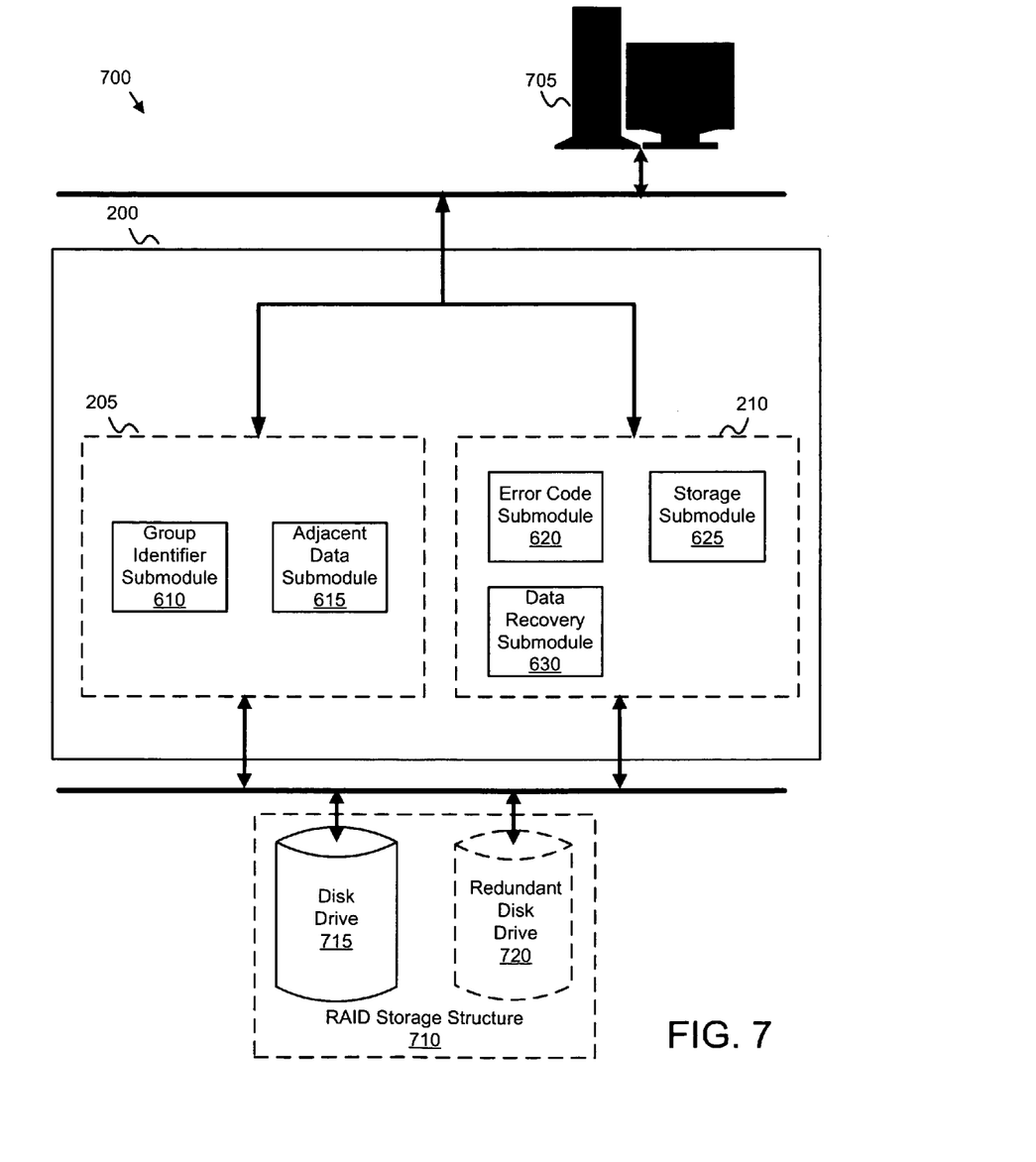
FIG. 7 is a system diagram illustrating one embodiment of a data verification system of the present invention.

FIG. 7 depicts one further embodiment of a data verification system 700. The system 700 includes the active data verification apparatus 200, a data processing device 705 and a redundant array of independent disk ("RAID") storage structure 710 including a disk drive 715 and a redundant disk drive 720. The data processing device 705 is, in one embodiment, a server. The data processing device 705 may also be a workstation.

In one embodiment of the system 700 the data processing device 705 generates the data to be stored on the storage device. The data is transmitted via a data communication connection to the controller 200. The data communication connection may be a data bus. The controller 200 identifies the active data in the active data identification module 205 and verifies the active data in the active data scrub module 210 and passes the data to the RAID storage structure 710 via a data communication connection. Although in the depicted embodiment, the RAID storage structure 710 comprises a single disk drive 715 and a redundant disk drive 720, a number of disk drives 715 and redundant disk drives 720 may be employed. In an alternative embodiment, other "RAID" configurations may be employed wherein the redundant disk drive 720 may contain redundant data for a plurality of dedicated disk drives 715. In another embodiment, the redundant data may be distributed across multiple dedicated disk drives 715 eliminating the need of a redundant disk drive 720. The present invention is envisioned such that it can be used with any storage device 105 configuration.

Figure 8:
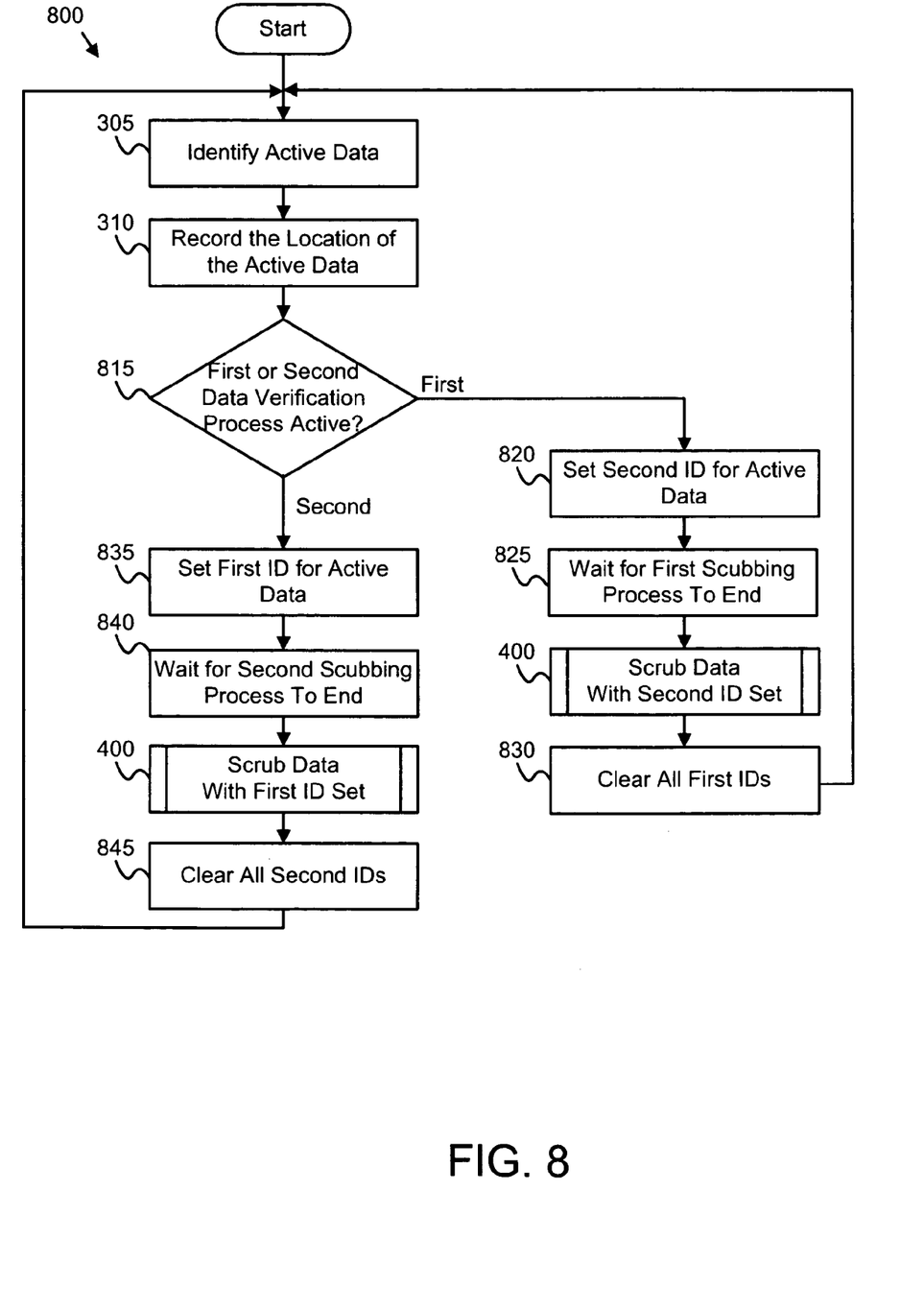
FIG. 8 is a flow chart diagram illustrating one embodiment of a data verification method in accordance with the present invention.

FIG. 8 depicts one embodiment of a data verification method 800. The method 800 includes identifying 305 active data and recording 310 the location of active data as described in FIG. 3. The method 800 further determines 815 if verification is in progress on either the first or the second group of active data. In one embodiment, if the method 800 determines 815 that verification is in progress on data with the first identifier, then the method 800 proceeds to set 820 the second identifier for active data. In one embodiment the first and second identifiers may be binary bits set in a central file or register. In an alternate embodiment the first and second identifiers may be variables set and stored with the active data on the storage device 105. In one embodiment, the method 800 waits 825 for verification cycle on the first active data group to terminate. The method 300 may wait 825 for notification of termination. The method 300 may also wait 825 a specified time interval to elapse. In one embodiment the specified time interval may be derived from a looped code with a specified number of iterations. In an alternative embodiment the specified time interval may be derived from a system clock or local oscillator. In one embodiment the specified time interval may be the time needed for the active 400 scrub routine to completely verify the first or second group of active data. In an alternative embodiment, the specified time interval may be a fixed amount of time allotted to verify the first or the second active data group. The method 800 scrubs 400 the active data with the second identifier set and clears 830 all first identifiers.

In one embodiment, if the method 800 determines 815 that verification is in progress on data with the second identifier, then the method 800 proceeds to set 835 the first identifier for the active data. In one embodiment, the method 800 waits 840 for the verification cycle on the second active data group to terminate. The method 800 scrubs 400 the active data with the first identifier set and clears 845 all second identifiers. In one embodiment, if the second group is being scrubbed 400 and if no scrub process is active, then the first identifier is set 835 for the active data. When the time interval has elapsed 840, and if no scrub process is active, a scrub process is activated 400 on all active data with the first identifier set 835, all second identifiers are cleared 845, and the method 800 repeats. In an alternative embodiment, if no scrub process is active, a scrub process is activated 400 on all active data with the first identifier set 835 when the time interval 840 has elapsed. In one embodiment, the specified 825, 840 time intervals may be the same. In an alternative embodiment, the specified 825, 840 time intervals may vary based upon the amount of data to be scrubbed 400. The method 800 scrubs 400 the active data with the first identifier set and clears 845 all second identifiers. The method 800 may be carried out by computer readable code.

The present invention verifies active data 505 on a storage device 105. The invention may be used to reduce the overhead of maintaining storage device 105 data integrity. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for verifying data, the apparatus comprising:

an active data identification module configured to identify active data segments and record the location of the active data segments on a storage device, wherein the active data identification module identifies active data segments from among dedicated data on the storage device, wherein the active data segment is data that has been written, moved or changed on the storage device within a predetermined time interval and has not been verified, wherein the active data identification module also identifies data segments that are adjacent to active data segments, adjacent data segments being data segments that are located within a specified proximity to active data segments, and wherein recording the location of the active data segment comprises at least one of recording the location in the form of data in a central file and placing a flag co-located with the active data segment on the storage device, wherein the active data identification module is farther configured to set a first identifier grouping the active data segments to be verified and to set a second identifier grouping the active data segments stored during the verification of the active data segments with the first identifier wherein the active data segments with the second identifier are verified subsequent to the verification of the active data segments with the first identifier; and an active data verification module configured to verify the active data segments identified by the active data identification module, wherein the active data verification module stores non-corrupt data and mitigates corrupt data, wherein mitigating corrupt data comprises at least one of error correction codes and retrieving and restoring redundant data from the storage device, and wherein the active data identification module and the active data verification module each comprise at least one of logic hardware and executable code, the executable code being stored on one or more computer readable media.

2. The apparatus of claim 1, wherein the active data verification module is configured to verify the active data segments by calculating an error code for the active data segments and comparing the calculated error code with a stored error code wherein the active data segments are invalid if the calculated error code and the stored error code are not equivalent.

3. The apparatus of claim 2, wherein the active data verification module is further configured to calculate the stored error code for data written to the storage device, and wherein the stored error code is stored with the active data segments.

4. The apparatus of claim 1, wherein the active data verification module is configured to re-verify data that has been restored.

5. The apparatus of claim 1, wherein the active data verification Module is further configured to recover the active data segments from redundant data.

6. The apparatus of claim 1, wherein the active data identification module is further configured to identify data segments adjacent to the active data segments, wherein the adjacent data segments are tracks of the storage device.

7. The apparatus of claim 6, wherein the active data verification module is further configured to verify data segments adjacent to active data segments on the storage device.

8. A data verifying storage device, comprising:
a storage device having an active data identification module configured to identify active data segments and record the location of the active data segments on the storage device, wherein the active data identification module identifies active data segments from among dedicated data on the storage device, wherein the active data segments are data that has been written, moved or changed on the storage device within a predetermined time interval and have not been verified, wherein the active data identification module also identifies data segments that are adjacent to active data segments, adjacent data segments being data segments that are located within a specified proximity to active data segments, and wherein recording the location of active data segments comprises at least one of recording the location in the form of data stored in a central file and placing a flag co-located with the active data segments on the storage device, wherein the active data identification module is further configured to set a first identifier grouping the active data segments to be verified and to set a second identifier grouping the active data segments stored during the verification of the active data segments with the first identifier wherein the active data segments with the second identifier are verified subsequent to the verification of the active data segments with the first identifier; and
the storage device further provided with an active data verification module configured to verify the active data segments identified by the active data identification module, wherein the active data verification module stores non-corrupt data and mitigates corrupt data, wherein mitigating corrupt data comprises at least one of error correction codes and retrieving and restoring redundant data from the storage device.

9. A system for verifying data, the system comprising:
a storage device configured to store and retrieve data; and
a controller configured to
identify active data segments among data on the storage device, wherein the controller identifies active data segments from among dedicated data on the storage device, wherein active data segments are data that has been written, moved or changed on the storage device within a predetermined time interval and has not been verified, wherein the controller also identifies data segments that are adjacent to active data segments, adjacent data segments being data segments that are located within a specified proximity to active data segments;
record a location of the active data segments, wherein recording the location of the active data segments comprises at least one of recording the location in the form data stored in a central file and placing a flag co-located with the active data segments on the storage device, wherein the controller is further configured to set a first identifier grouping the active data segments to be verified and to set a second identifier grouping the active data segments stored during the verification of the active data segments with the first identifier wherein the active data segments with the second identifier are verified subsequent to the verification of the active data segments with the first identifier; and
verify the integrity of the active data identified by the controller, wherein the controller stores non-corrupt data and mitigates corrupt data, wherein mitigating corrupt data comprises at least one of error correction codes and retrieving and restoring redundant data from the storage device.

10. The system of claim 9, the storage device further comprising a hard disk.

11. The system of claim 9, wherein the controller is further configured to verify the active data segments by calculating an error code for the active data segments and comparing the calculated error code with a stored error code wherein the active data segments are invalid if the calculated error code and the stored error code are not equivalent.

12. The system of claim 11, wherein the controller is further configured to recover the active data segments if the active data segments are invalid.

13. The system of claim 12, wherein the controller is further configured to recover the active data segments from redundant data.

14. The system of claim 9, wherein the controller is further configured to identify and verify data segments adjacent to the active data segments of the storage device.

15. A computer readable storage medium comprising computer readable code configured to carry out a method for verifying data, the method comprising:
identifying active data segments from among dedicated data on the storage device, wherein the active data segments are data that has been written, moved or changed on the storage device within a predetermined time interval and has not been verified, wherein identifying active data segments includes identifying data segments that are adjacent to active data segments, adjacent data segments being data segments that are located within a specified proximity to active data segments;
recording a location of the active data segments, wherein recording the location of the active data segments comprises at least one of recording the location in the form of data stored in a central file and placing a flag co-located with the active data segments on the storage device, wherein the method further comprises setting a first identifier grouping the active data segments to be verified and setting a second identifier grouping the active data segments stored during the verification of the active data segments with the first identifier, wherein the active data segments with the second identifier are verified subsequent to the verification of the active data segments with the first identifier; and
verifying the active data segments, wherein verifying the active data segments includes storing non-corrupt data and mitigates corrupt data, wherein mitigating corrupt data comprises at least one of error correction codes and retrieving and restoring redundant data from the storage device.

16. The computer readable storage medium of claim 15, wherein the method further comprises verifying the active data segments by calculating an error code for the active data segments and comparing the calculated error code with a stored error code wherein the active data segments are is invalid if the calculated error code and the stored error code are not equivalent.

17. The computer readable storage medium of claim 16, wherein the method further comprises calculating the stored error code for data written to the storage device, the stored error code stored with the data.

18. The computer readable storage medium of claim 16, wherein the method further comprises re-verifying data that has been restored.

19. The computer readable storage medium of claim 18, wherein the method further comprises recovering the active data segments from redundant data.

20. The computer readable storage medium of claim 15, the method further comprising identifying and verifying data segments adjacent to the active data segments, wherein the adjacent data segments comprise tracks of a storage device.

21. A method for verifying data, the method comprising:
identifying active data segments on a storage device, wherein identifying active data segments comprises identifying active data segments from among dedicated data on the storage device, wherein the active data segments are data that has been written, moved or changed on the storage device within a predetermined time interval and has not been verified, wherein identifying active data segments includes identifying data segments that are adjacent to active data segments, adjacent data segments being data segments that are located within a specified proximity to active data segments,
recording the location of the active data segments, wherein recording the location of the active data segments comprises at least one of recording the location in the form of data stored in a central file and placing a flag co-located with the active data segments on the storage device, recording the location of the active data segments further comprising setting a first identifier grouping the active data segments and setting a second identifier grouping the active data segments stored during the verification of the active data segments with the first identifier wherein the active data segments with the second identifier are verified subsequent to the verification of the active data segments with the first identifier; and
verifying the active data segments, wherein verifying the active data segments comprises storing non-corrupt data and mitigating corrupt data, wherein mitigating corrupt data comprises at least one of error correction codes and retrieving and restoring redundant data from the storage device.

22. The method of claim 21, further comprising verifying the active data segments by calculating an error code for the active data segments and comparing the calculated error code with a stored error code wherein the active data segments are invalid if the calculated error code and the stored error code are not equivalent.

23. The method of claim 22, further comprising calculating the stored error code for data written to the storage device, the stored error code stored with the data.

24. The method of claim 22, further comprising re-verifying data that has been restored.

25. The method of claim 24, further comprising recovering the active data segments from redundant data.

26. The method of claim 21, further comprising identifying and verifying data segments adjacent to the active data segments, wherein the adjacent data segments are tracks of a storage device.

27. An apparatus for verifying data, the apparatus comprising:
means for identifying active data segments on a disk, wherein the means for identifying active data segments on a disk identifies active data segments from among dedicated data on the disk, wherein the active data segments are data that has been written, moved or changed on the disk within a predetermined time interval and has not been verified, wherein means for identifying active data segments on a disk also identifies data segments that are adjacent to active data segments, adjacent data segments being data segments that are located within a specified proximity to active data segments;
means for recording a location of the active data segments, wherein recording the location of the active data segments comprises at least one of recording the location in the form of data stored in a central file and placing a flag co-located with the active data segments on the storage device, wherein the means for recording a location of the active data segments is further configured to set a first identifier grouping the active data segments to be verified and to set a second identifier grouping the active data segments stored during the verification of the active data segments with the first identifier wherein the active data segments with the second identifier are verified subsequent to the verification of the active data segments with the first identifier; and
means for verifying the active data segments identified by the means for identifying active data segments, wherein the means for verifying the active data segments stores non-corrupt data and mitigates corrupt data, wherein mitigating corrupt data comprises at least one of error correction codes and retrieving and restoring redundant data from the storage device, wherein the means for identifying active data segments on a disk, the means for recording a location of the active data segments, and the means for verifying the active data segments each comprise at least one of logic hardware and executable code, the executable code being stored on one or more computer readable media.

* * * * *